3,169,822
DYEING WITH DYES HAVING CH₂SCH₂CH₂-HALIDE GROUPS
David Irwin Randall, New Vernon, and Wilhelm Schmidt-Nickels, Little York, N.J., assignors to General Aniline & Film Corporation, New York, N.Y., a corporation of Delaware
No Drawing. Filed Nov. 20, 1961, Ser. No. 153,682
8 Claims. (Cl. 8—1)

This invention relates to a novel dyeing process, and more particularly to a process for coloring fibers and the like with a group of dyestuffs effective for producing colored products in any desired shades of improved fastness properties and the like.

A number of dyeing processes are known in which dyeings of improved fastness properties are obtained by reaction between the dyestuff and the fiber. Among the large number of reactive dye classes proposed for use in such processes, only a few are commercially useful. These are the cyanuric, the pyrimidine and the vinyl sulfone or sulfatoethylsulfone types. These types have sufficient reactivity with the fiber to be applied at the usual dyeing temperatures of boiling or below, but are somewhat expensive to produce and are generally not sufficiently stable to or applicable in the wide range of pH conditions often found necessary in treating different types of fibers. Further, the dyeings produced with these dyestuffs have more or less pronounced tendencies to hydrolyze with cleavage of the dye-fiber linkage. For example the dyestuff-fiber linkages derived from the cyanuric and pyrimidine types of reactive dyes hydrolyze on standing in dilute acids. On the other hand, the dyestuff-fiber linkages derived from reactive dyestuffs of the vinyl sulfone or sulfatoethylsulfone type are not stable to attack by strong aqueous alkali.

It is an object of this invention to provide a novel process for coloring fibers and other articles in any desired shades of improved fastness properties. Another object of this invention is the provision of a process for coloring fibers, particularly textile fibers and the like, which will not be subject to one or more of the above disadvantages. Other objects and advantages will appear as the description proceeds.

The attainment of the above objects is made possible by this invention which comprises a process for coloring fibers containing a reactive hydrogen atom including the step of treating the fibers under acid binding conditions, with an aqueous dispersion of a chromophoric compound containing at least one and up to eight or more fiber-reactive groups of the formula —CRR—S—CRR—CRR—X wherein the R's are the same or different monovalent members of the group consisting of H, alkyl, alkynyl, alkenyl, cycloalkyl, aryl, and heterocyclic, and X-substituted derivatives thereof, and X is halogen. It has been found that this process enables the production of colored products having surprisingly good fastness properties, particularly wash fastness and fastness to alkaline and acid perspiration and the like. Further, the process is much more stable to acid and alkaline conditions of application and the resulting colored products have improved stability to both acid and basic hydrolytic cleavage of the dyestuff-fiber linkage.

The fiber-reactive group shown in the above formula has been found to be exceedingly effective in enabling reaction of a chromaphoric compound containing the same with fibers containing a reactive hydrogen atom in the molecule, with liberation of HX. The chromophoric compounds useful in the present process may be ascribed the general formula D(—CRR—S—CRR—CRR—X)ₙ wherein R and X have the values given above, $n$ has a value of 1 to 8, and D contains a solubilizing group such as —SO₃H, —OSO₃H, —COOH, —NHSO₂—, —OH and the like, and represents a chromophoric group which may be either the radical of a colored organic compound or the radical of a colorless compound containing groups enabling the conversion of such colorless compound to a colored compound in situ on the fiber, and is joined to the depicted fiber-reactive group through a terminal carbon atom.

D may represent the residue of any organic dyestuff molecule containing a solubilizing group, such dyestuff generally being of aromatic character in containing at least one carbocyclic or heterocyclic ring. Venkataraman's "Chemistry of Synthetic Dyes," Academic Press, N.Y., 1952, volumes I and II discloses a multitude of organic dyestuffs substantially all of which may be employed in providing the chromophoric group D in the above formula. Natural organic dyestuff may of course also be employed in the same manner.

Preferably, the D moiety comprises the residue of an azo, quinoid, indigoid, thioindigoid, di- or tri-arylmethane, xanthene, acridine, azine, oxazine, thiazine, stilbene, sulphur, or cyanne (including phthalocyanine) dyestuff. Optionally, the D moiety may comprise the residue of a colorless compound containing for example a group promoting coupling with a diazotized primary aromatic amine, or a diazotizable primary amine group whereby the coloration may be produced in situ on the fiber after reaction of the above defined chloromophoric compound with the fiber by suitable development as by, respectively, reaction with a diazotized primary aromatic amine or diazotization and reaction with a coupling component. Other mechanisms and/or groupings are of course known for developing color in situ on the fiber, including metallizing, reducing and/or oxidizing treatments and the like.

The D moiety is joined to the depicted fiber-reactive group through a terminal carbon atom which may be cyclic or the terminus of an aliphatic bridging link composed of one or more C, S, O, or N atoms or any combination thereof with any desired side chains on the C or N atoms therein. Thus, the bridging link, if present, may contain from 1 to 18 or more linking atoms. As illustrative of representative bridging links there may be mentioned —SO₂NR—, —SO₂NRNR—, —O—, —NR—, —S—, —CO—, —CONR—, —NRCO—, phenylene, and the like, all joined to the fiber-reactive group, and if desired to a cyclic atom in the D moiety, through a —(CRR)ₘ— group wherein $m$ is from 1 to 18 or more. The bridging link may also be —(CRR)ₘ— with no hetero atoms in the bridge. Any of the aforementioned bridging links may be combined in any manner, number and/or order. R in these briding links has the values given above.

R in the above formula may represent H, alkyl of 1 to 18 carbon atoms including stearyl but preferably lower alkyl of 1 to 3 carbon atoms such as methyl, ethyl, propyl, isopropyl, the corresponding acetylenically unsaturated alkyls (alkynyl), the corresponding ethylenically unsaturated alkyls (alkenyl), cyclohexyl, phenyl, napthyl, furyl, and other heterocyclic groups joined through a carbon atom to the depicted carbon atom, and X-substituted derivatives thereof. It will be understood that these R groups may be further substituted by inert substituents such as carboxyl, sulfonic, alkoxy, nitro, hydroxy, sulfato, cyano, residues corresponding to the D moiety described above, and the like, and may be chain-interrupted by hetero atoms such as O, S, N, and the like. Preferably, R is H.

In the above formula, X preferably represents chlorine although it may if desired represent other halogen anions such as bromine, and iodine and the like.

It will be noted that the S atom in said fiber-reactive group is bonded to aliphatic carbon atoms only and that the R groups are bonded to said aliphatic carbon atoms through a terminal carbon atom. The R groups on the X-bonded carbon atom may, less desirably, be bonded to said carbon atom through a bridging link of the type described above without unduly affecting the reactivity of said fiber-reactive group with the fiber.

The above defined chromophoric compounds employed in the process of this invention may in general be prepared by a number of different methods. One such method involves reaction of a mercaptan compound of the formula HS—CRR—CRR—OH, preferably mercaptoethanol (HS—CH$_2$—CH$_2$—OH), with a chloromethylated dyestuff followed by reaction of the resulting intermediate with HX or equivalent to substitute the terminal OH group by X.

In this manner a number of reactive groups may be inserted, for example up to 8 or more, depending upon the number of chloromethyl groups in the dyestuff. This reaction is representative of a general method for producing the above defined chromophoric compounds of the present invention wherein $n$ moles of said mercaptan compound are reacted with a chromophoric compound of the formula D—(CRR-halogen)$_n$ wherein D is as defined above and is joined to the remainder of the molecule through a terminal carbon atom which is part of a carbocycle or heterocycle or the terminus of a bridging link as defined above, R has the values given above, halogen represents chlorine, bromine, or iodine or the like, and $n$ has a value of 1 to 8 or more, followed by reaction of the resulting intermediate with $n$ moles of HX or equivalent. These reactions are preferably carried out in the presence of an acid binding agent as defined below.

Another method of preparing the above-described chromophoric compounds employed in the process of this invention involves chloromethylation of nitrobenzene, reaction of the resulting p-nitro-benzylchloride with mercaptoethanol (or other mercaptan compounds as defined above) followed by reduction of the nitro group in the resulting p-nitrobenzylthioethanol to amino as by catalytic hydrogenation under pressure in ethanol in the presence of platinum oxide catalyst (Adams) and reaction of the reduction product with HX or equivalent such as thionyl chloride in chloroform. The resulting compound when using for example mercaptoethanol and concentrated HCl, has the formula

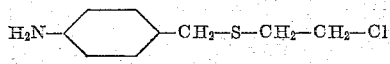

These chromophoric compounds may be directly employed in the present process for reaction with the fiber followed by diazotization and coupling on the fiber, or they may be employed in the production of a colored compound and then reacted with the fiber. Thus, these compounds may be diazotized and coupled in known manner and with known coupling components to produce azo dyestuffs or they may be reacted with dyestuffs containing reactive chlorine or other halogen per se or in chloromethyl groups, sulfonylchloride groups (by preliminary reaction of the dyestuff with chlorsulfonic acid), etc.

Correspondingly, p-nitrotoluene can be bis-chloromethylated, the resulting 2,6-bischloromethyl-4-nitrotoluene reacted with mercaptoethanol, the nitro group in the resulting intermediate reduced to the corresponding amine, and the reduced compound reacted with thionyl chloride or equivalent to produce a compound of the formula

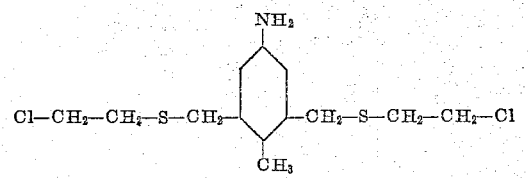

Intermediates of the above type may be employed directly for reaction with the fiber followed by diazotization and coupling on the fiber, or for reaction with dyestuffs containing reactive halogen atoms as described above. Such intermediates, containing the $$-CH_2-S-CH_2CH_2-X$$

group in the preferred position meta to the amino group, are derivable from corresponding nitrobenzylthioethanols disclosed and claimed in Buc et al., Serial No. 858,037, filed December 8, 1959, now U.S. 3,019,268, by reduction and reaction with HX.

The chromophoric compounds employed in this invention are highly effective for coloring natural and synthetic fibers, particularly cellulosic textile fibres, in any desired shades of good to excellent fastness properties. The coloring process involves dyeing (including printing) the fibrous materials by application thereto under acid-binding conditions of an aqueous dispersion or solution of the defined chromophoric compound containing a least one fibre-reactive group at any temperature ranging from ambient temperatures to the boiling point of the medium. The dispersion may have a pH ranging from about 7 to 14 although generally alkaline conditions are preferred. It will be understood that as employed herein, the term "aqueous dispersion" is intended to include solutions, dispersions, or stable or colloidal suspensions of the reactive chromophoric compound, appropriately thickened in known manner when employed in a printing process. The aqueous dispersion may be applied by immersion, jig dyeing, padding, spraying, printing or in any other desired manner.

Although aqueous dispersions are disclosed and claimed for use in the present process, it will be understood that this is only the preferred embodiment and that the water in the aqueous medium may be replaced in whole or in part by a water miscible, polar organic solvent such as acetone, alcohol, dioxane, dimethylformamide, of the like without departing from the scope of this invetnion. It will likewise be understood that the medium containing the reactive chromophoric compounds described above may contain adjuvants commonly used in dyeing processes as for example solution aids such as urea and thiodiglycol, migration inhibitors such as cellulose ethers, sodium chloride, sodium sulfate and other salts, wetting agents preferably of the nonionic surface active type as produced for example by polyoxyethylenation of such reactive hydrogen containing compounds as higher molecular weight alcohols, phenols, fatty acids, and the like, and thickening agents for the production of printing pastes such as methyl cellulose, starch, gum arabic, gum tragacanth, locust bean gum, sodium alginate, and the like.

The reaction between the reactive chromophoric compound and the fiber containing a reactive hydrogen atom involves liberation of acid HX and the reaction is accordingly favored by acid binding conditions. As acid binding agents which may be added to the dispersion of reactive chromophoric compounds, there may be mentioned generally alkali metal (sodium, potassium, lithium, etc.) hydroxide, carbonate, bicarbonate, phosphate, silicate, borate, acetate or the like, or an organic base such as triethanolamine or the like, in an amount sufficient to neutralize the liberated HX in whole or in part. Such amount may range from less than 0.5% up to 10% or more in the dispersion.

In carrying out the coloring process, the speed of reaction, and hence the time of contact between the fiber being dyed and the reactive chromophoric compound, will generally vary inversely with the temperature. The fiber may for example be continuously padded with the aqueous dispersion of reactive chromophoric compound, squeezed to, for example, a 50 to 200% liquor pickup, dried and heated at 200 to 500° F. for an hour or more to 30 seconds or less. Alternatively, the fiber may be allowed to remain in contact with the aqueous dispersion of reactive chromophoric compound until the reactive dyeing process is completed, which may range from 10 minutes or less to two hours or more, followed by washing and rinsing.

The process of this invention has been found to be highly effective for dyeing and printing cellulosic fibers of natural or synthetic type such as cotton, linen, wood, paper, regenerated cellulose and the like in any desired shades of good to excellent fastness properties. As a result of the reactive dyeing process of this invention, such dyed or printed cellulosic fibers may be ascribed the formula D—CRR—S—CRR—CRR-cellulose wherein D, R, and X have the values given above and "cellulose" represents a cellulose molecule deprived of a reactive hydrogen atom as originally present for example in hydroxy groups therein. When a reactive chromophoric compound contains two or more fiber-reactive groups, a further fibercross-linking reaction is made possible, whereby the product could be ascribed the formula D(—CRR—S—CRR—CRR-cellulose)$_n$, in which $n$ is for example 2 to 8 and the cellulose fibers may be the same or different.

In addition to cellulose and its derivatives, the process of this invention may be employed for dyeing other fibers containing reactive hydrogen atoms as present for example directly on a carbon, nitrogen or other atom in the linear chain of the fiber polymer, or in a free side group bonded directly or indirectly thereto such as —NRH, —SH, —OH, —CRRH, etc. The resulting dyeing may be ascribed formulae similar to that of the cellulose dyeing described above. As representative of such other fibers, there may be mentioned natural and synthetic proteinaceous fibers such as wool, silk, leather, animal hides and skins, casein, and zein, polyamides such as the 6- and 6,6-nylons and polypyrrolidone, polyurethanes, polyesters, copolymers or homopolymers containing recurring carboxylic or cyano groups, polyvinyl alcohol, partially hydrolyzed cellulose acetate and polyvinyl acetate, polyvinyl chloride, and mixtures, copolymers and graft copolymers thereof. Mixed fabrics and fibers may likewise be so treated.

The fibers may be in any of the usual forms and in natural bulk, interwoven, knitted or felted form as for example in the form of staple fiber or continuous filaments in bulk form or in the form of tow, rope, yarns, slubbings, warps, fabrics, felts, and the like, and treated as a wound package, running length, fibrous stock, bulk, etc. Further, although this invention has been described for use in the coloration of fibrous material, it will be understood that the process may employed for dyeing other articles including film and sheet material, and other objects of any size, shape and configuration without departing from the spirit and scope of this invention.

The following examples are only representative of the present invention and are not to be regarded as limitative. All parts and proportions referred to herein and in the appended claims are by weight unless otherwise indicated.

*Example 1*

An amount of
5.2 parts by weight of the compound of the formula

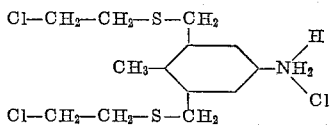

was dissolved in
150 parts by volume water and
5 parts by volume conc. hydrochloric acid (36%), and diazotized at 0°–5° C. which required
10 parts by volume 10% (weight/volume) sodium nitrite solution (=1.0 part by weight NaNO$_2$).
The diazonium solution was stirred into a 0°–5° C. cold solution of
100 parts by volume water,
18 parts by volume 20% sodium hydroxide solution and
6.1 parts by weight of 60% paste of 1-(4-sulfophenyl)-3-methyl-pyrazoline-5 (=3.7 parts by weight 100%).

The dyestuff precipitated. It was filtered off and sucked dry on the filter. It has the formula

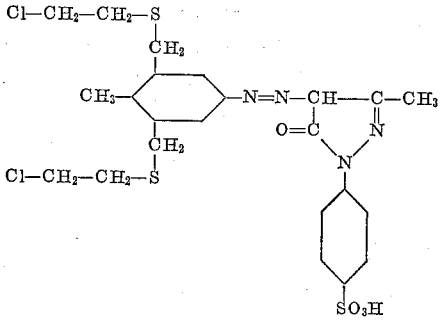

Cotton cloth was padded with a solution of 1% each of the above dyestuff and soda ash at 65° C., dried, heat cured at 150° C. for 3 minutes, rinsed, soaped in boiling Igepal (polyoxyethylenated alkyl phenol nonionic surfactant) solution for 5 minutes and rinsed again. The cotton was dyed a bright yellow of excellent wash fastness.

*Example 2*

An amount of
4.2 parts by weight of the compound of the formula

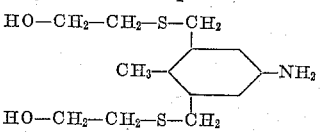

was dissolved in
150 parts by volume water and
7.4 parts by volume conc. hydrochloric acid, and diazotized at 0°–5° C. which required
10 parts by volume 10% (weight/volume) sodium nitrite solution (=1.0 part by weight NaNO$_2$).
The diazonium solution was stirred into a 0–5° C. cold solution of
100 parts by volume water,
21.4 parts by volume 20% sodium hydroxide solution and
6.1 parts by weight of 60% paste of 1-(4-sulfophenyl)-3-methylpyrazolone-5 (=3.7 parts by weight 100%).
The dyestuff was precipitated from its solution by the addition of
45 parts by weight sodium chloride. The product was filtered off and sucked dry on the filter. It has the formula:

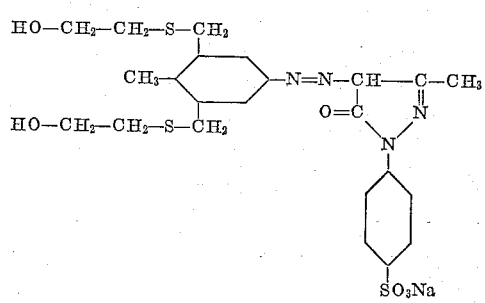

(a) For comparison: Cotton cloth was padded evenly strong yellow from a 3% soda alkaline solution of the above dyestuff. The padding was dried and heat cured at 150° C. for 5 minutes. Soaping in boiling Igepal for less than 5 minutes removed the dyestuff completely showing that there was no cotton reactivity.

(b) A charge of
50 parts by volume conc. hydrochloric acid (36%) and
4.3 parts by weight of the dyestuff of the above structure was heated under agitation gradually to 74° C. during 15 minutes and stirred at 74-75° C. for 1 hour. After cooling the dyestuff was filtered off, washed twice with ice water and sucked down sharply. The dyestuff is identical with the dyestuff of Example 1.

It was padded on cotton cloth as in (a) above, dried, heat cured at 150° C. for 5 minutes and soaped in boiling Igepal solution for 5 minutes. The cotton was dyed yellow shades of excellent wash fastness identical to Example 1.

*Example 3*

The same diazonium solution described in Example 1 was prepared and added at 0-5° C. alternatingly with 20% sodium hydroxide solution to a solution of 100 parts by volume water and 36.1 parts by volume 14.5% (weight/volume) N-acetyl H acid (1-acetylamino-8-naphthol-3,6-disulfonic acid) (=5.2 parts by weight 100%) in such a way that a pH range of 5-6 was maintained. The dyestuff precipitated. It was filtered off. It has the formula

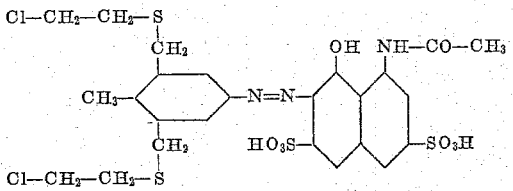

Cotton cloth is boiled for 10-15 minutes in a 3% aqueous solution of the above dyestuff, made alkaline with soda ash, rinsed, soaped and rinsed again. The resulting red dyeing has very good fastness properties. Cotton cloth padded with a similar solution, dried, heat cured for 3 minutes at 150° C., soaped and rinsed is dyed red of excellent wash fastness (No. 3 AATCC), good fastness to crocking, and good fastness to both acid and alkaline perspiration.

*Example 4*

A dye of the formula

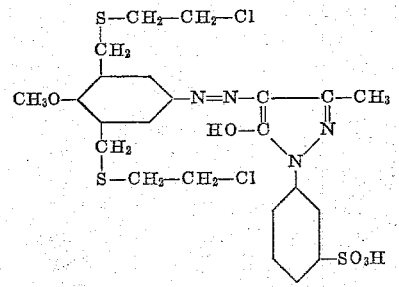

is applied to cotton by the procedure of Example 2. Bright yellow shades are obtained having excellent wash and light fastness.

*Example 5*

A dye of the formula

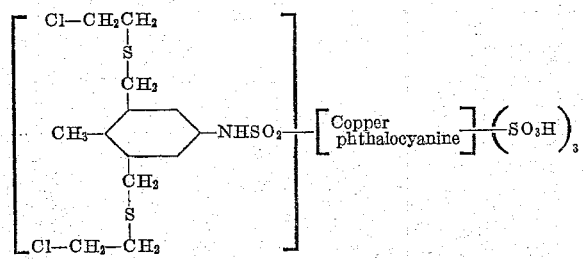

is applied to cotton by the procedure of Example 3. Turquoise blue shades are obtained having excellent wash and light fastness.

This invention has been disclosed with respect to certain preferred embodiments and various modifications and variations thereof will become obvious to the person skilled in the art. It is to be understood that such modifications and variations are to be included within the spirit and scope of this invention.

We claim:
1. A process for coloring fibers containing a reactive hydrogen atom comprising treating the fibers:
  (1) under acid binding conditions, with
  (2) an aqueous dispersion of a
  (3) chromophoric compound containing
  (4) two fiber-reactive groups substituted in meta position relative to each other in the same phenyl nucleus of a chromophore and having the formula

wherein
  (a) X is halogen.
2. A process as defined in claim 1 wherein X is Cl.
3. A process as defined in claim 1 wherein the fibers are cellulose fibers.
4. A process as defined in claim 3 wherein X is Cl.
5. A process for coloring fibers containing a reactive hydrogen atom comprising treating the fibers:
  (1) under acid binding conditions, with
  (2) an aqueous dispersion of a
  (3) compound of the formula

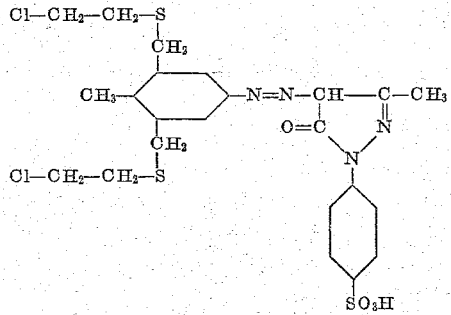

6. A process for coloring fibers containing a reactive hydrogen atom comprising treating the fibers:
  (1) under acid binding conditions, with
  (2) an aqueous dispersion of a
  (3) compound of the formula

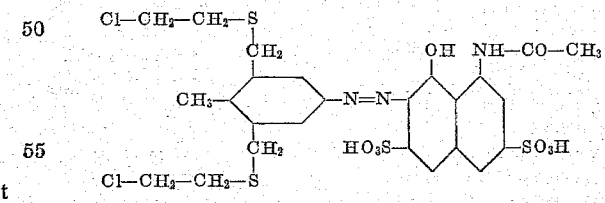

7. A process for coloring fibers containing a reactive hydrogen atom comprising treating the fibers:
  (1) under acid binding conditions, with
  (2) an aqueous dispersion of a
  (3) compound of the formula

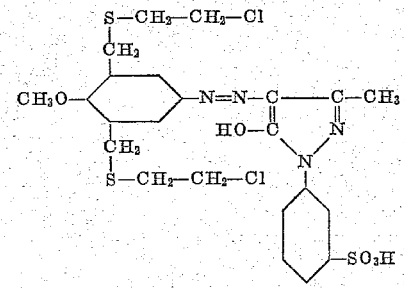

8. A process for coloring fibers containing a reactive hydrogen atom comprising treating the fibers:
(1) under acid binding conditions, with
(2) an aqueous dispersion of a
(3) compound of the formula

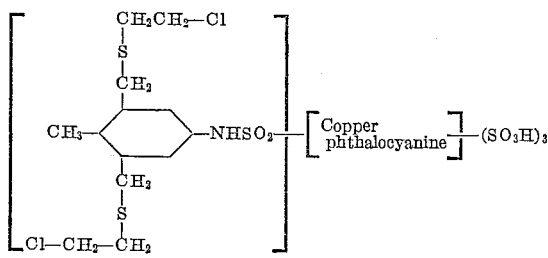

References Cited in the file of this patent
UNITED STATES PATENTS

| | | |
|---|---|---|
| 2,992,240 | Lodge | July 11, 1961 |
| 3,005,852 | Freyermuth | Oct. 24, 1961 |
| 3,009,920 | Jaeger | Nov. 21, 1961 |
| 3,023,218 | Tartter | Feb. 27, 1962 |
| 3,066,005 | Wedemeyer | Nov. 27, 1962 |

FOREIGN PATENTS

| | | |
|---|---|---|
| 1,239,220 | France | July 11, 1960 |
| 1,181,107 | France | Jan. 5, 1959 |
| 854,962 | Great Britain | Nov. 23, 1960 |

OTHER REFERENCES

Derwent Belgian Reports 54B, July 1959, page C1.
Derwent Belgian Report 70A, pages C31 and 32, December 1960.
Wegmann: Textile Praxis, 1958, Col. 13, pages 1056–1061.